No. 843,060. PATENTED FEB. 5, 1907.
J. C. ARONHALT.
ROCKING CHAIR.
APPLICATION FILED FEB. 13, 1906.
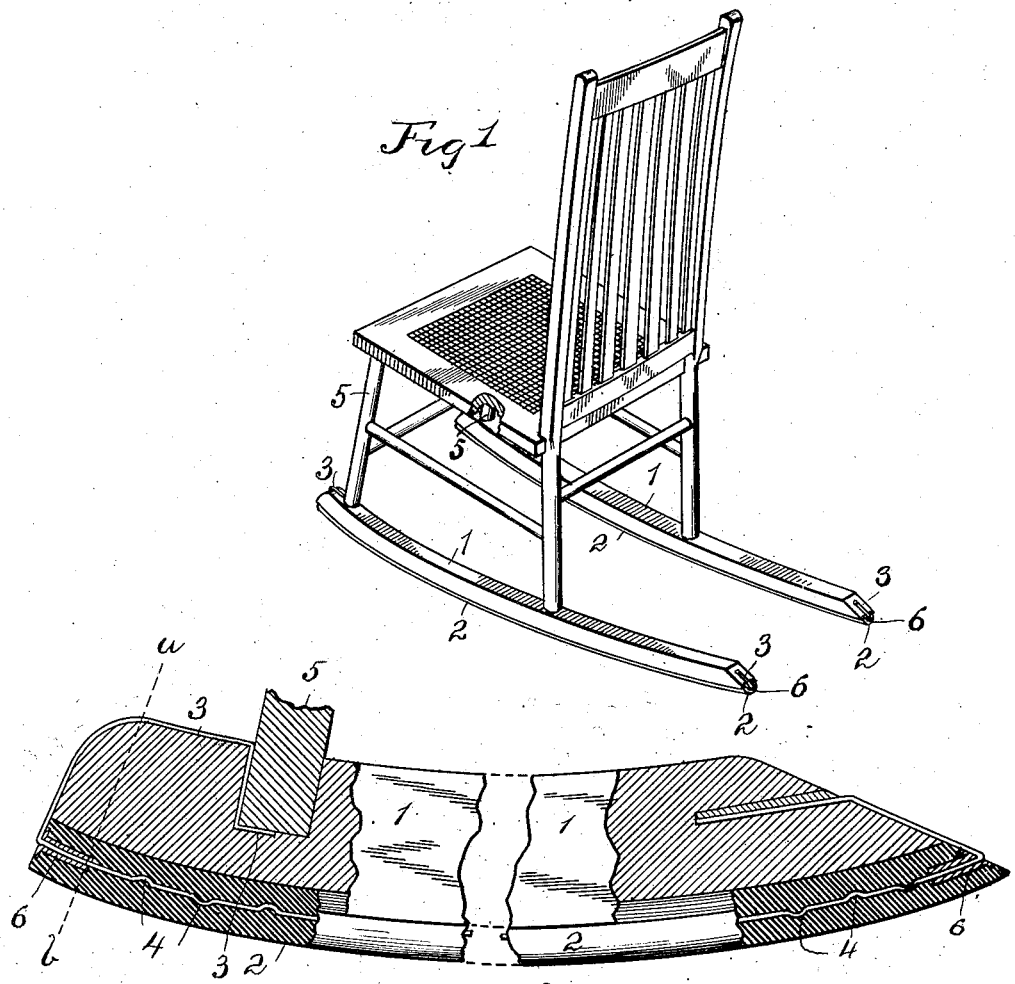
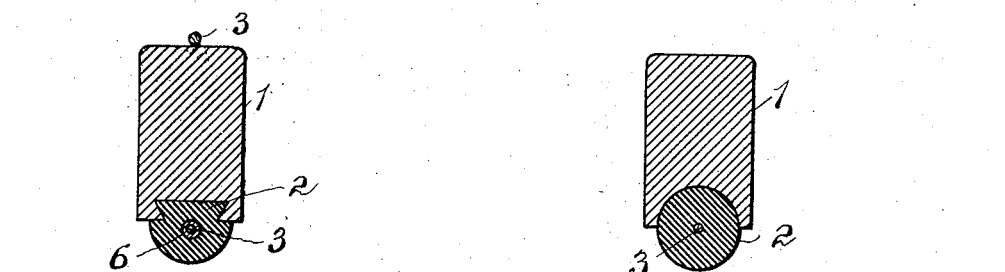
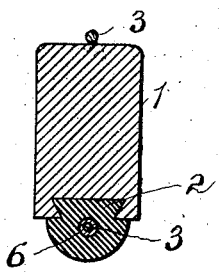 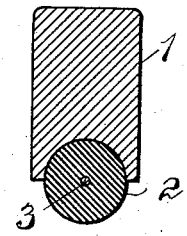
Witnesses
R. E. Hamilton
G. C. LaMountain
Inventor
James C. Aronhalt
By Warren D. House,
His Attorney

UNITED STATES PATENT OFFICE.

JAMES C. ARONHALT, OF KANSAS CITY, MISSOURI.

ROCKING-CHAIR.

No. 843,060.      Specification of Letters Patent.      Patented Feb. 5, 1907.

Application filed February 13, 1906. Serial No. 300,854.

*To all whom it may concern:*

Be it known that I, JAMES C. ARONHALT, a citizen of the United States, residing at Kansas City, in the county of Jackson and State of Missouri, have invented new and useful Improvements in Rocking-Chairs, of which the following is a specification.

My invention relates to improvements in rocking-chairs.

It relates to the class of rocking-chairs having resilient tires secured lengthwise to the under sides of the rockers.

The object of the invention is to provide a novel means for quickly and securely fastening the tire to the rocker.

My invention provides, further, a rubber tire fitted to the under side of the rocker and having embedded lengthwise therein a wire the projecting ends of which are secured to the rocker.

My invention provides, further, means by which the wire when it is being secured to the rocker is stretched so as to tightly bind the tire to the rocker.

My invention provides, further, a resilient tire having embedded therein a longitudinal wire having one or more lateral projections which firmly engage the tire and cause it to be stretched when the wire is stretched in the operation of securing it to the rocker.

In the accompanying drawings, which illustrate the invention, Figure 1 is a perspective view of a rocking-chair the rockers of which have secured to them the resilient tires of my invention. Fig. 2 is a side elevation view of a rocker having secured to it a tire mechanism of my invention, the middle portion of the rocker and tire being broken away and the ends of the rocker and tire being shown in vertical section. Fig. 3 is a cross-section taken on the dotted line *a b* of Fig. 2. Fig. 4 is a cross-section of a rocker having secured to it a round tire having embedded therein the longitudinal securing-wire.

Similar characters of reference denote similar parts.

1 denotes the two rockers, preferably longitudinally grooved on their under sides, said grooves also being preferably dovetail in cross-section, the dovetail grooves having fitted in them the resilient tires 2, composed, preferably, of soft rubber, said tires projecting below the lower sides of the rockers, respectively. Each tire 2 has embedded in it a longitudinal wire 3, having one or more lateral projections 4, preferably formed by kinking the wire, said projections serving to prevent the wire being pulled through the tire when the wire is being secured to the rocker in the manner hereinafter described. The upper sides of the rockers 1 adjacent their forward ends are provided, respectively, with vertical holes, in which are mounted in the ordinary manner the lower ends of the front chair-legs 5. In each end of each tire is mounted a protecting-thimble 6, through which the wire 3 extends, said thimble serving to prevent the wires cutting the tires when the wires are bent upwardly and secured to the rockers.

The following is the preferred manner of securing the wires to the rockers: The rubber tires are slipped lengthwise into the dovetail grooves of the rockers, said grooves first being coated with cement for uniting the tires to the rockers, after which the rear ends of the wires 3 are bent upwardly and then inserted in the longitudinal holes provided therefor, one in the rear end of each rocker. The forward legs 5 are then withdrawn from the holes in the rockers, after which the forward ends of the wires 3 are bent upwardly over the forward ends of the rockers to the tops thereof, respectively, and then passed into the vertical holes in the upper sides of the rockers, the extreme ends of the wires being bent laterally. The chair-legs 5 are then forced into the holes in the rockers, thus drawing downwardly the wires 3, so as to stretch them and hold them tightly in place. The projections 4 on the wires prevent the loosening of the wires during the tightening operation just described. They also serve to prevent the tires from moving lengthwise on the wires through compression of the tires caused by the weight of the person occupying the chair.

My invention may be variously modified without departing from its spirit.

Having thus described my invention, what I claim, and desire to secure by Letters Patent, is—

1. In a rocking-chair, the combination with the rocker, of a rubber tire secured lengthwise to the under side of the rocker and having protecting-tubes secured one in each end of the tire, and a wire embedded in the tire and extending through said tubes, the projecting ends of the wire being secured to the rocker.

2. In a rocking-chair, the combination with the rocker, of a rubber tire secured to the under side and lengthwise of the rocker and provided with protecting-tubes embedded in its respective ends, and a wire having one or more lateral projections and embedded in the tire and extending through the tubes, the ends of the wire being secured to the rocker.

3. In a rocking-chair, the combination with the rocker, having a hole in its upper side, of the chair-leg mounted in said hole, a rubber tire secured lengthwise to the under side of the rocker, and a wire embedded lengthwise in the tire and having one end secured to the rocker, and the other end secured in the hole in the rocker by said leg.

4. In a rocking-chair, the combination with the rocker having a hole in the rear end and a hole in the upper side adjacent the forward end, of the chair-leg mounted in said hole in the forward end, a rubber tire secured lengthwise to the under side of the rocker, and a wire embedded in the tire lengthwise and having one end secured in the hole in the rear end of the rocker, the forward end of the wire extending over the top of the rocker at the forward end of the rocker and extending downward along the side and below the lower end of the leg.

5. In a rocking-chair, the combination with the rocker having in its upper side adjacent the forward end a hole, of the chair-leg mounted in said hole, a rubber tire secured lengthwise to the under side of the rocker, and a wire embedded in the tire and having one or more lateral projections, one end of the wire being secured to the rocker and the other end passing over the forward end of the rocker to the top thereof and thence into said hole between the leg and the rocker.

6. In a rocking-chair, the combination with the rocker having a longitudinal groove in its lower side and having a hole in its upper side adjacent one end, of the chair-leg secured in said hole, a rubber tire mounted in said groove, and a wire embedded lengthwise in said tire and having one projecting end secured to the rocker and the other end extending over the top of the rocker and into said hole between the leg and the rocker.

In testimony whereof I affix my signature in presence of two subscribing witnesses.

JAMES C. ARONHALT.

Witnesses:
  WARREN D. HOUSE,
  E. B. HOUSE.